Patented May 23, 1944

2,349,574

UNITED STATES PATENT OFFICE 2,349,574

CATALYTIC CONVERSION OPERATION

Arthur L. Conn, Chicago, Ill., assignor to Standard Oil Company, Chicago, Ill., a corporation of Indiana Application August 21, 1940, Serial No. 353,457

9 Claims. (Cl. 196—52)

This invention relates to a process for converting hydrocarbon oils such as gas oil and heavier hydrocarbon oils into gasoline of high knock rating. Low knock rating naphthas, particularly straight run heavy naphthas, may likewise be converted into high knock rating naphthas by the use of the process which forms the subject matter of this invention. The invention relates more particularly to a method of treating hydrocarbon oils in the vapor phase with powdered solid catalysts, generally metal oxides, the conditions and catalysts being selected to produce the desired conversion to gasoline of high knock rating.

One object of the invention is to contact hydrocarbon oil vapors at a high cracking temperature with a powdered catalyst in a continuous manner while providing the desired time of contact by means of enlarged reaction chambers. Another object of the invention is to regulate more accurately the time of contact between the catalysts and the hydrocarbon vapors. A more specific object of the invention is to classify the catalyst according to particle size and sedimentation rate, segregating the classified catalysts into separate treating zones and regulating the vapor velocity within the treating zones to provide for retarded settling and obtain the desired contact time. Another object of the invention is to provide a suitable apparatus for carrying out the process. Other objects of the invention will become apparent from the following description of the process.

Figure 1:
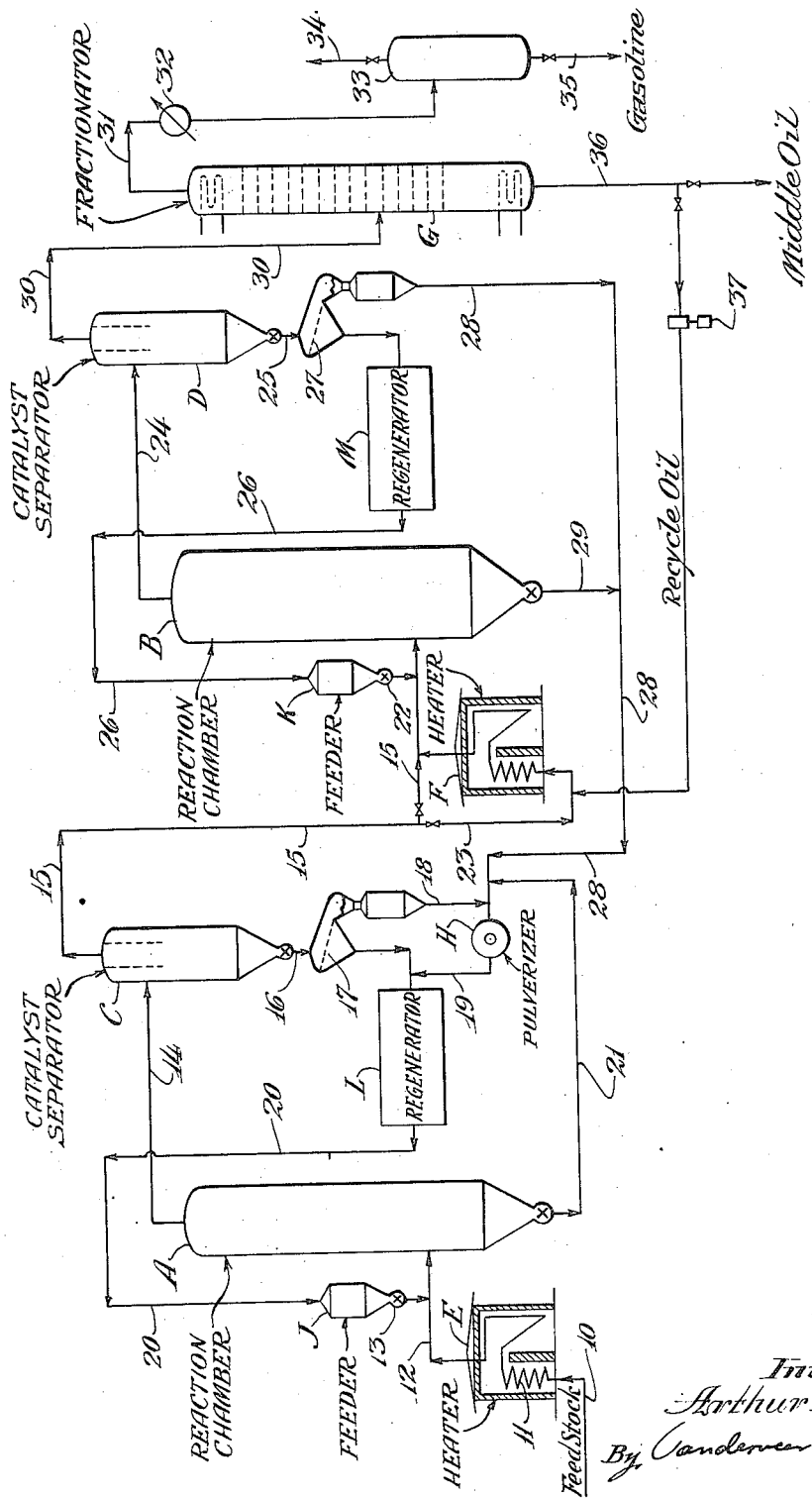
Figure 2:
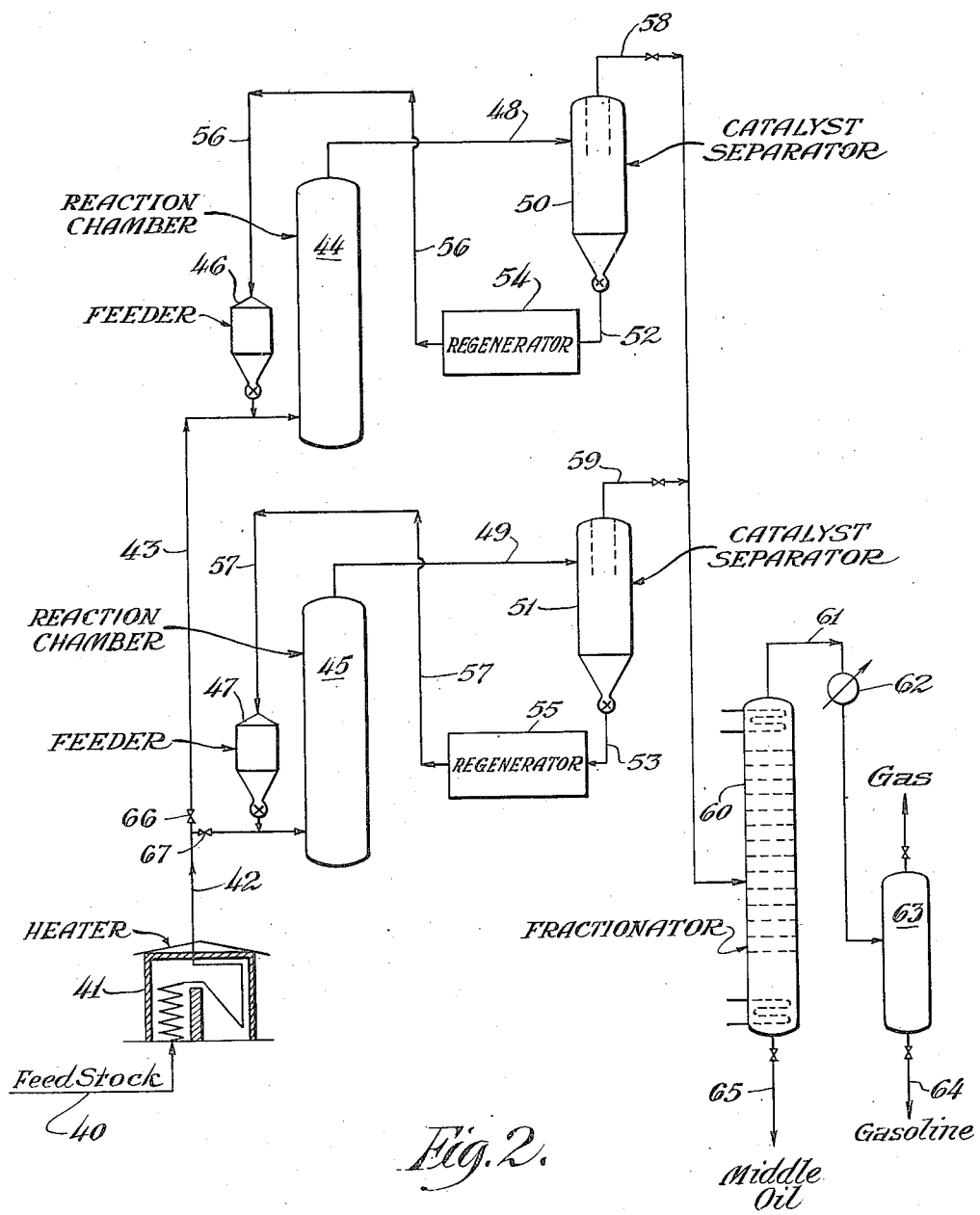

The invention is illustrated by means of drawings in which Figure 1 shows a series arrangement of reaction zones for contacting the oil vapors with the catalyst while Figure 2 shows a parallel arrangement for effecting contact of the oil vapors and the catalyst.

The catalysts employed in my process are usually metal oxides, either natural or synthetic, in the form of a fine powder of definitely controlled particle size. Siliceous and argillaceous materials are suitable and I may use for the purpose, such catalysts as silica gel, activated clays, bentonite, kieselguhr activated by certain metal oxides, alumina, bauxite, the commercial clay product known as Super Filtrol, magnesia or alumina supported on active silica, etc. For certain operations, such as the reforming of naphthas, I may use dehydrogenation catalysts such as activated alumina, chromium oxide, molybdenum oxide, vanadium oxide and mixtures of these, for example, molybdena deposited in small amounts on alumina. In the cracking of heavy oils, gas oil and the like, I may also employ magnesia, titania and zirconia, especially as supports for activating substances such as thoria and alumina.. Silica prepared by the action of acids on fused silicates, particularly the artificially prepared silicate slags, glasses, etc., may be used.

In general, the catalyst is ground to particle size within the range of about 80 to 400 mesh and finer. The following screen analysis illustrates the gradation in particle size which might be expected after powdered catalyst has been circulated in the unit for a considerable length of time:

| Mesh | | | |
|---|---|---|---|
| Through 325 | 200-325 | 80-200 | Coarser than 80 |
| 29% | 24% | 46% | 1% |

It is understood that this may vary over a wide range, since the original catalyst charged may be as fine as the following analysis:

| Mesh | | | |
|---|---|---|---|
| Through 325 | 200-325 | 80-200 | Coarser than 80 |
| 92% | 7% | 0.9% | 0.1% |

In the contacting of hydrocarbon vapors with such a catalyst, it has heretofore been difficult to obtain uniform contacting time due to the difference in particle size. Unless very high velocities are employed at all times in the vapor stream, the larger particles remain in contact for a much longer time than the smaller particles because of their greater sedimentation rate in upflow reactors. It is particularly desirable to provide for a certain amount of sedimentation in order to increase the length of time during which the catalyst is in contact with the oil vapors, thereby obtaining a greater effect from a given amount of catalyst. Unless the reaction time can be controlled, however, undesirable effects are encountered. Too long a time of catalyst exposure results in the deposition of substantial amounts of carbon on the catalyst, substantial loss of catalytic activity, a tendency for the reaction to follow the course of a non-catalytic pyrolysis resulting in a larger yield of carbon and gas, and the production of gasoline of an undesirably lower knock rating. Too short exposure time results in inefficient use of the catalyst. These difficulties are largely overcome by the present process which will be described in more detail in connection with the accompanying drawings.

Referring to Figure 1, A and B are upflow reaction zones of which there may be two, three, four or more. C and D are powdered catalyst separators of the cyclone type in which the vapors and catalyst are introduced tangentially giving the gas within the separator a rotational movement which separates the powdered catalyst particles by centrifugal action. E and F are pipe heaters for heating and vaporizing the charging stock. G is a fractionating tower and H is a pulverizer for reducing the size of particles which may become agglomerated in the process. J and K are catalyst feeders and L and M are catalyst regenerators.

In carrying out the operation of the process, charging stock oil is supplied by pipe 10 and flows through coil 11 in heater E where it is heated and vaporized and the vapors are discharged at a high conversion temperature, generally within the range of 850 to 1050° F., depending on the character of the stock. In the case of heavy naphtha, reforming temperatures above 950° F. are ordinarily employed.

As the vapors flow through transfer line 12, they encounter a stream of powdered catalyst introduced by catalyst feeder J. Various mechanical devices may be used to introduce the catalyst, such as the rotating star valve 13 shown in the drawing. Other devices which may be used are screw pumps, injectors, inert gas pressure chambers, etc. or the catalyst may be forced into the oil stream by the hydrostatic head of a high tower in which the catalyst is kept. Continuous "aeration" of the catalyst with inert gas keeps it in a fluid condition in the tower. The amount of catalyst introduced will ordinarily be within the range of 1 to 6 parts of catalyst per part of oil by weight. More or less catalyst may be used when desired, for example ¼ part of catalyst up to 20 parts of catalyst by weight. It is preferred that the catalyst be added hot in order to avoid reducing the temperature of the oil excessively; in fact, the catalyst temperature may even exceed the oil vapor temperature, thereby supplying a large part of the heat necessary for the conversion reaction.

The suspension or dispersion of catalyst and oil vapors flows into the lower part of reaction chamber A and passes upwardly through the reaction chamber to the outlet line 14 which conducts the mixture to cyclone separator C. Reaction chamber A is designed to provide for a definite vapor velocity in the upwardly flowing vapors. This may be controlled by choosing the correct cross-sectional area for the reaction chamber and the reaction velocity may be regulated during operation in several ways. For example, the rate of introducing feed stock to heater E will directly affect the vapor velocity. Likewise, reaction chamber A may be provided with adjustable baffles for altering the cross-sectional area inside the chamber, thus increasing the vapor velocity as well as introducing in a desired degree sufficient turbulence to regulate the sedimentation of catalyst. Furthermore, steam or any other inert gas may be added to increase the velocity in the reaction chamber without changing the charge rate. Sedimentation of catalyst is also dependent upon the particle size or "grade" and it is desirable to employ a catalyst of uniform particle size in order to obtain uniform sedimentation and resulting uniform time of contact. Neglecting turbulence, if the catalyst settles, for example at the rate of 5 feet per second and the vapor velocity is 10 feet per second, it will be observed that the time during which the catalyst is in contact with the oil vapors will be twice as long as would be the case were no sedimentation provided.

Dispersion of catalyst and oil vapor is separated in cyclone separator C, the hydrocarbon vapor being discharged by line 15 and the catalyst by line 16. It will be noted that since the particles entering separator C (and also separator D) have been largely graded to a given size, the design of this separator may be made more efficient for their removal. At this point, the catalyst may be graded or screened by screen 17 to remove any particles coarser than those desired for the reaction. A gas flotation classifier may be used instead of screen 17. Coarse material may be conducted by line 18 to pulverizer H and thence by line 19 to regenerator L along with the bulk of the catalyst from C.

Regeneration of the catalyst is accomplished by contacting with an oxidizing gas, preferably air diluted with sufficient inert gas, flue gas, etc., to regulate the oxygen concentration and the regeneration temperature. Excessive temperatures on regeneration must be avoided although most catalysts may be regenerated at temperatures as high as 1050 to 1100° F. The catalyst may also be regenerated in chambers similar to reaction chambers A and B providing retarded settling. The hot regenerated catalyst is thence conducted by line 20 back to feeder J. Transportation of the catalyst in pipe lines is facilitated by "aeration," preferably with the gas or vapor with which it is being contacted. Where transportation is desired without accompanying reaction or regeneration, inert gas is preferable. Here again, the catalyst contact time is more readily controlled with classified catalyst than with non-classified catalyst. Any coarse particles of catalyst, for example agglomerated particles which settle to the bottom of chamber A, may be withdrawn by line 21 and conducted to the pulverizer H where they are disintegrated and returned to the system. If desired, the catalyst may be classified after regeneration instead of before.

Hydrocarbon vapors in line 15 are next conducted to reaction chamber B where they are further reacted with additional catalyst introduced from catalyst feeder K by feeder valve 22. Feeder K and valve 22 may operate in much the same manner as described for feeder J, the essential being that a uniform stream of powdered catalyst is introduced at a controlled rate into the vapor stream flowing through line 15. If desired, the temperature of the vapors charged to chamber B may be increased by by-passing part or all of the vapors from line 15 through pipe heater F by connection 23, the temperature being brought to the same point as the temperature in transfer line 12, if desired, although a higher or lower temperature may be used in reaction chamber B, depending on a number of circumstances. Control of reaction temperature may also be facilitated by control of catalyst temperature entering the stream from feeder K.

The vapors withdrawn from separator C by line 15 will usually contain a small amount of fine catalyst which was not removed in separator C and which represents a certain amount of unavoidable degradation of catalyst supplied to reaction chamber A. The amount of catalyst so degraded may be about 1 to 5% of the catalyst charged to reaction chamber A. Separator C will ordinarily be designed to recover only the catalyst of a certain grade of coarseness, i. e., only that catalyst falling within the grade of material supplied by feeder J. In this respect the separator C acts as a grading device for rejecting catalyst material which is too fine to operate satisfactorily with the vapor velocity and turbulence conditions existing in reaction chamber A.

The additional catalyst introduced by feeder K is preferably of a finer grade than the catalyst introduced by feeder J. Thus, where the catalyst introduced initially by feeder J may be within the range of 100 to 250 mesh, the catalyst supplied by feeder K may be 250 to 400 mesh. Narrower ranges of screen size may be employed, if desired. For example, feeder J may be supplied with catalyst of 150 to 200 mesh and feeder K may be supplied with catalyst of 250 to 325 mesh. By using more uniform material, I can obtain accurate control of the reaction conditions in reaction chambers A and B. I may also employ additional reaction chambers in the series, thereby using 3, 4 or more grades of catalyst, all successively finer. I may also operate several units simultaneously using slightly different grades of catalyst on each unit with means for grading the catalyst continually while in service and supplying the correct grade of catalyst for each operation.

Returning now to reaction chamber B, the catalyst supplied thereto is permitted to settle or sediment to give the desired optimum time of exposure of the catalyst to the oil vapors to obtain the desired utilization of the catalyst. The settling is retarded by the flow of vapors upward so that catalyst does not actually separate from the vapor. Inasmuch as the catalyst in reaction chamber B is finer, the sedimentation will be slower and in general reaction chamber B may have a greater cross-sectional area, thus providing lower vapor velocities upwardly therein and allowing more time for sedimentation of the catalyst to take place. For example, if the vapor velocity in chamber A is from 10 to 20 feet per second, the velocity in chamber B may be only 5 feet per second. Vapor velocities may ordinarily be employed within the range of 2 to 50 feet per second, depending upon catalyst particle size. Other means may be provided for obtaining the desired sedimentation rate in reaction chambers A and B. For example, the reaction chambers may be provided with suitable screen baffles, either horizontal or vertical, to prevent turbulence and thereby improve sedimentation conditions.

The catalyst-hydrocarbon vapor dispersion is removed from reaction chamber B by line 24 leading to cyclone separator D where most of the catalyst is separated and returned to the system by line 25 leading to regenerator M and thence by line 26 to feeder K. Any coarse agglomerated material in the catalyst may be removed by screen 27 and conducted by line 28 to pulverizer H, previously mentioned. Any agglomerated material settling in the bottom of reaction chamber B may likewise be recycled by line 29.

Vapors are withdrawn from cyclone separator D by line 30 and conducted to fractionator G where the desired gasoline vapors are withdrawn by line 31 leading to condenser 32 and receiver 33. Gas produced in the process is eliminated by line 34 and gasoline by line 35. The gasoline may be stabilized or refined in any suitable manner and the resulting products will usually be about 75 to 85 octane number, C. F. R.—M. Products heavier than gasoline are withdrawn as reflux from the bottom of fractionator G by line 36 and this so-called middle oil may be utilized as fuel, or as a charging stock in other cracking processes, particularly thermal cracking processes, or as a recycle oil in the present process. When employed as a recycle oil, I may conduct it to the second stage of the process by pump 37, the amount recycled being varied to assist in regulating the vapor velocity in reaction chamber B. Increasing the amount of stock recycled will have the effect of reducing the time of exposure of the catalyst to oil vapors in the reaction chamber B.

Figure 2 is a simplified flow diagram of a modification of my process wherein the oil vapor flows in parallel to the reaction chambers A and B or additional reaction chambers (not shown), if desired. Referring to Figure 2, oil is charged by line 40 to heater 41 where it is vaporized and the vapors are conducted by line 42 and header 43 to the reaction chambers 44 and 45 in parallel. Coarse catalyst is introduced into one reaction chamber 44 by feeder 46 and fine catalyst is introduced into the other reaction chamber by feeder 47. The time of exposure of the catalyst in the two reaction chambers is regulated in the manner hereinabove described and may be adjusted to be the same in both reaction chambers.

The catalyst-hydrocarbon vapor dispersion is conducted by lines 48 and 49 to separators 50 and 51 from which the catalyst is withdrawn by lines 52 and 53 leading to regenerators 54 and 55 and thence back to the feeders 46 and 47 by lines 56 and 57 respectively. If desired, a single regenerator may be employed for all the catalyst and the regenerated catalyst may be suitably graded and distributed to the feeders 46 and 47.

Hydrocarbon vapors are withdrawn from separators 50 and 51 by lines 58 and 59 leading to fractionator 60 where gasoline vapors are removed by line 61, condensed in condenser 62 and collected in receiver 63. The gasoline product is withdrawn by line 64. Middle oil boiling above the gasoline range is withdrawn from fractionator 60 by line 65.

The parallel arrangement of catalyst reaction zones has the advantage of simplicity of regulating the vapor velocity in the separate reaction zones by distributing the vapors by header 43 and valves 66 and 67. The proportion of catalyst charged to the vapors in the separate reaction chambers may be varied at will to increase or decrease the extent of cracking and to produce a substantially uniformly cracked product in vapor lines 58 and 59. Catalyst which may be degraded in size may be transferred from one reaction chamber to another employing the finer material, by means indicated in the description of Figure 1. Thus, vapors from line 58 may be conducted to separator 51 instead of passing directly to fractionator 60 as shown in the drawings. In this case degraded catalyst from reaction chamber 44 is continually eliminated from that system and employed in the reaction chamber 45. Alternatively, catalyst carried over into the fractionator 60 may be recovered from the middle oil and recycled to reaction chamber 45.

The amount of catalyst recycled has little or no effect on the time of exposure of the catalyst to the oil vapors which depends largely on the vapor velocity and the rate of sedimentation. My process of classification of catalyst makes possible a more uniform control of both the conversion and the regeneration steps in powdered catalyst conversion of oils.

Having thus described my invention, what I claim is:

1. The process of converting hydrocarbon oils by the action of powdered catalyst dispersed therein at a high conversion temperature which comprises contacting the oil vapors with the catalyst in a plurality of stages and employing different grades of catalysts of different particle size in different stages, providing enlarged reaction zones in at least two stages, providing upward flow of said vapors thru said reaction zones and regulating the conditions of catalyst sedimentation in said reaction zones to provide a different time of exposure of the catalyst to the oil vapors in said different reaction stages.

2. The process of claim 1 wherein the oil vapors are conducted through at least two reaction zones in series, the catalyst employed in the first reaction zone is substantially all separated from the oil vapors after leaving said first reaction zone and additional catalyst is added to the oil vapors in the second reaction zone.

3. The process of claim 1 wherein the oil vapor stream is divided and charged to at least two reaction chambers in parallel, a coarse catalyst employed in one reaction zone and a fine catalyst in the other reaction zone and the time of contact and proportion of catalyst are regulated to effect substantially the same extent of conversion of oil in each reaction zone.

4. The process of claim 1 wherein the catalyst is regenerated and recycled in the process and agglomerated catalyst produced in the process is separated from the recycled catalyst, pulverized to the particle size of one of said catalyst grades and returned to that stage of the process in which said grade of catalyst is employed.

5. The process of claim 1 wherein the time of exposure of the catalyst to the oil vapors in said reaction stages is controlled by regulating the upflowing vapor velocity in said reaction zones.

6. The process of converting hydrocarbon oils, comprising contacting the vapors thereof at elevated temperature with a dispersion of powdered catalyst in at least two vertically elongated reaction zones, in which the hydrocarbon vapors flow upwardly in series and the vapor velocity is sufficiently low to provide retarded sedimentation of the catalyst particles therein, thereby increasing the time of exposure of the catalyst to the oil vapors, maintaining a catalyst of definite particle size in the first reaction zone of said series, maintaining a catalyst of a finer particle size in a subsequent catalyst zone of said series, recovering the catalysts from both reaction zones and separating from the catalyst recovered from said subsequent reaction zone coarser catalyst particles agglomerated in the process and recycling said coarser catalyst particles to said first reaction.

7. The process of converting hydrocarbon oils, comprising contacting the vapors thereof at elevated temperature with a dispersion of powdered catalyst in at least two vertically elongated reaction zones, in which the hydrocarbon vapors flow upwardly in series and the vapor velocity is sufficiently low to provide for substantial retarded sedimentation of the catalyst particles therein, thereby increasing the time of exposure of the catalyst to the oil vapors, maintaining a catalyst of definite particle size in the first reaction zone of said series, maintaining a catalyst of a finer particle size in a subsequent catalyst zone of said series, maintaining different upward vapor velocities in said reaction zones recovering the catalysts from both reaction zones and fractionating the hydrocarbon vapors resulting from said catalyst contacting operation into gasoline and a heavier middle oil fraction and recycling a regulated amount of said middle oil fraction to said subsequent reaction zone to assist in regulating the velocity of vapors therein.

8. In the process of converting hydrocarbon oils by contacting the vapors thereof with a suspended, powdered catalyst at elevated conversion temperature wherein the powdered catalyst is separated from the converted oil vapors, regenerated by the action of an oxidizing gas and recycled in the process, the improvement comprising effecting the reaction between catalyst and oil vapors in a plurality of enlarged vertically elongated upflow reaction zones, employing catalysts of different particle sizes in different reaction zones, and regulating the velocity of oil vapors and catalyst particle sizes to obtain substantially the same retarded sedimentation of the catalyst in the said reaction zones, thereby achieving the desired optimum time of exposure of catalyst to oil vapors in said reaction zones.

9. In the process of converting hydrocarbon oils by contacting the vapors thereof with a suspended, powdered catalyst at elevated conversion temperature wherein the powdered catalyst is separated from the converted oil vapors, regenerated by the action of an oxidizing gas and recycled in the process, the improvement comprising effecting the reaction between catalyst and oil vapors in a plurality of enlarged vertically elongated upflow reaction zones, employing catalysts of different particle sizes in different reaction zones, passing the oil vapors in series through said reaction zones, employing catalyst of successively smaller particle sizes in succeeding reaction zones, and regulating the velocity of oil vapors and catalyst particle sizes to obtain substantially the same retarded sedimentation of the catalyst in the said reaction zones, thereby achieving the desired optimum time of exposure of catalyst to oil vapors in said reaction zones.

ARTHUR L. CONN.